(12) United States Patent
Kling et al.

(10) Patent No.: US 11,236,765 B2
(45) Date of Patent: Feb. 1, 2022

(54) CO-MOLDED METALLIC FAN CASE CONTAINMENT RING

(71) Applicant: United Technologies Corporation, Farmington, CT (US)

(72) Inventors: Colin J. Kling, Glastonbury, CT (US); Darin S. Lussier, Guilford, CT (US); James F. O'Brien, Glastonbury, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 293 days.

(21) Appl. No.: 16/663,479

(22) Filed: Oct. 25, 2019

(65) Prior Publication Data

US 2020/0056626 A1 Feb. 20, 2020

Related U.S. Application Data

(62) Division of application No. 15/185,573, filed on Jun. 17, 2016, now Pat. No. 10,458,433.

(Continued)

(51) Int. Cl.
*F01D 21/04* (2006.01)
*F04D 29/52* (2006.01)
(Continued)

(52) U.S. Cl.
CPC .......... *F04D 29/526* (2013.01); *B29C 70/023* (2013.01); *B29C 70/72* (2013.01);
(Continued)

(58) Field of Classification Search
CPC .... F04D 29/024; F04D 29/526; F04D 29/664; F01D 21/045; F01D 5/282; F01D 25/24;
(Continued)

(56) References Cited

U.S. PATENT DOCUMENTS

| 5,447,411 A | 9/1995 | Curleyetai. |
| 5,516,257 A | 5/1996 | Kasprow et al. |

(Continued)

FOREIGN PATENT DOCUMENTS

| EP | 0030179 A1 | 6/1981 |
| EP | 1674245 A1 | 6/2006 |

(Continued)

OTHER PUBLICATIONS

European Search Report for EP Application No. 16175115.1 dated Nov. 23, 2016.

(Continued)

*Primary Examiner* — Woody A Lee, Jr.
(74) *Attorney, Agent, or Firm* — Carlson, Gaskey & Olds, P.C.

(57) ABSTRACT

A method of fabricating a fan case for a gas turbine engine defines a metallic ring including an outer surface and an inner surface. A first composite material is assembled about the outer surface of the metallic ring. A second composite material is assembled about the first composite material. The first composite material and the second material are cured about the metallic ring within a tool to form a first subassembly. The first subassembly is removed from the tool. A fan case assembly for a gas turbine engine and a gas turbine engine are also disclosed.

10 Claims, 4 Drawing Sheets

Related U.S. Application Data

(60) Provisional application No. 62/180,855, filed on Jun. 17, 2015.

(51) Int. Cl.
| | |
|---|---|
| *F04D 29/66* | (2006.01) |
| *F04D 29/02* | (2006.01) |
| *B29C 70/88* | (2006.01) |
| *F01D 5/28* | (2006.01) |
| *B29C 70/02* | (2006.01) |
| *B29C 70/72* | (2006.01) |
| *F01D 25/24* | (2006.01) |
| *B29C 70/86* | (2006.01) |

(52) U.S. Cl.
CPC ............ *B29C 70/86* (2013.01); *B29C 70/885* (2013.01); *F01D 5/282* (2013.01); *F01D 21/045* (2013.01); *F01D 25/24* (2013.01); *F04D 29/023* (2013.01); *F04D 29/664* (2013.01); *F05D 2300/224* (2013.01); *F05D 2300/603* (2013.01); *F05D 2300/701* (2013.01); *Y02T 50/60* (2013.01)

(58) Field of Classification Search
CPC ....... B29C 70/023; B29C 70/72; B29C 70/86; B29C 70/885
See application file for complete search history.

(56) References Cited

U.S. PATENT DOCUMENTS

| | | | |
|---|---|---|---|
| 6,637,186 B1 * | 10/2003 | Van Duyn | F01D 11/12 415/9 |
| 6,652,222 B1 * | 11/2003 | Wojtyczka | B32B 3/12 415/200 |
| 7,402,022 B2 | 7/2008 | Harper et al. | |
| 7,595,112 B1 | 9/2009 | Cano et al. | |
| 7,866,939 B2 | 1/2011 | Harper et al. | |
| 7,914,251 B2 | 3/2011 | Pool et al. | |
| 8,021,102 B2 | 9/2011 | Xie et al. | |
| 8,061,967 B2 * | 11/2011 | Marlin | F01D 21/045 415/9 |
| 8,454,298 B2 * | 6/2013 | Cardarella, Jr. | F01D 21/045 415/9 |
| 8,672,609 B2 | 3/2014 | Lussier et al. | |
| 8,734,703 B2 | 5/2014 | Havens et al. | |
| 8,757,958 B2 | 6/2014 | Lussier | |
| 8,827,629 B2 * | 9/2014 | Voleti | F01D 25/24 415/1 |
| 8,926,277 B2 | 1/2015 | Walters | |
| 9,114,882 B2 | 8/2015 | Robertson, Jr. et al. | |
| 9,200,531 B2 | 12/2015 | Robertson, Jr. et al. | |
| 9,644,493 B2 | 5/2017 | Clarkson | |
| 9,840,936 B2 * | 12/2017 | Lussier | B29D 99/006 |
| 9,945,254 B2 | 4/2018 | Ivakitch et al. | |
| 10,137,607 B2 | 11/2018 | Riedel | |
| 2005/0176813 A1 | 8/2005 | Baell et al. | |
| 2010/0078259 A1 | 4/2010 | Stevenson et al. | |
| 2013/0108417 A1 | 5/2013 | Renon | |
| 2013/0195605 A1 * | 8/2013 | Robertson | F01D 11/18 415/1 |
| 2013/0216364 A1 | 8/2013 | Evans | |
| 2014/0003923 A1 | 1/2014 | Finnigan et al. | |
| 2016/0169044 A1 | 6/2016 | Clarkson et al. | |

FOREIGN PATENT DOCUMENTS

| | | |
|---|---|---|
| WO | 2007/035184 A2 | 3/2007 |
| WO | 2013/165505 A2 | 11/2013 |

OTHER PUBLICATIONS

Kevlar® Aramid Fiber. Technical Guide [online], Dupont, Mar. 15, 2015 [retrieved Sep. 27, 2018], Retrieved from the Internet: http://www.dupont.com/content/dam/dupont/products-and-services/fabrics-fibers-and-nonwovens/fibers/documents/Kevlar_Technical_Guide.pdf> Section II< p. II-2, Table II-2.

PR-1592 Potting and Molding Compound. Product description [online]. Bergdahl Associates, Inc., Apr. 9, 2015 [Retrieved Sep. 27, 2018]. Retrieved from the Internet: https://www.bergdahl.com/sealant-adhesives/pr-1592/>. Description.

Coefficients of Linear Expansion. Table [online]. The Engineering ToolBox, Feb. 22, 2006 [Retrieved Sep. 27, 2017], Retrieved from the Internet: https://www.engineeringtoolbox.com/linear-expansion-coefficients-d_95.html> Product table.

* cited by examiner

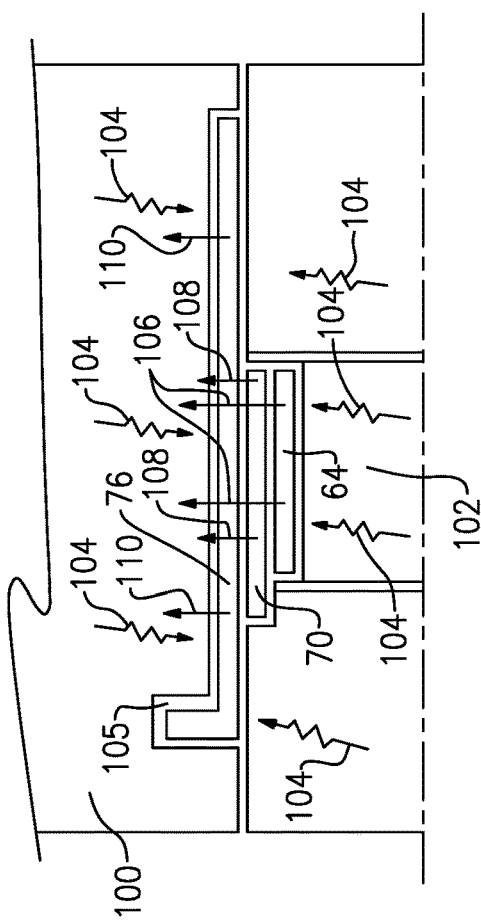
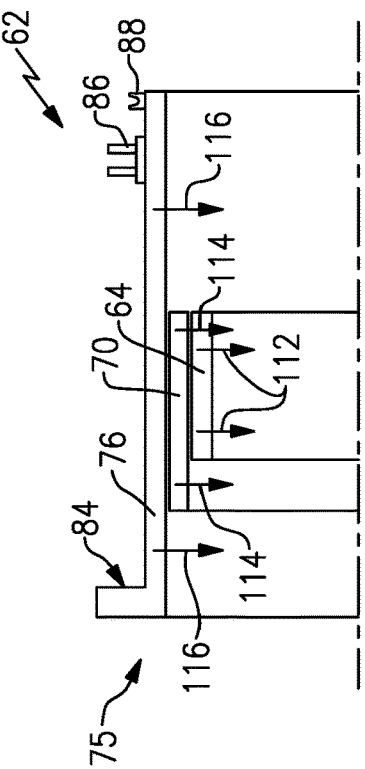
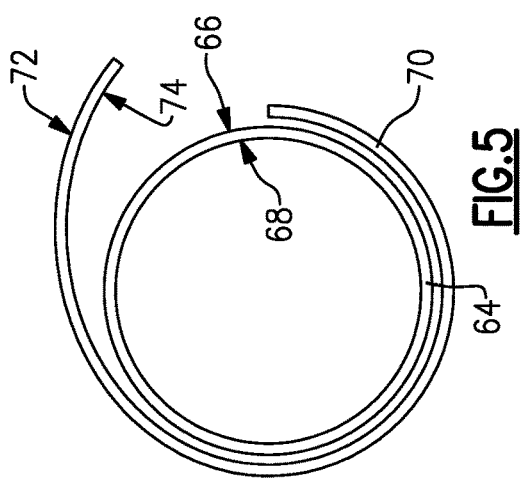
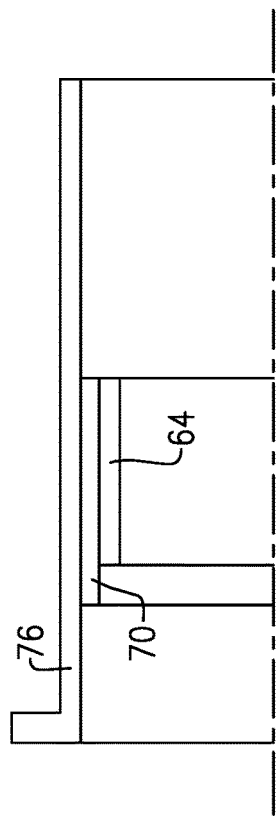
FIG.7
FIG.8
FIG.5
FIG.6

CO-MOLDED METALLIC FAN CASE CONTAINMENT RING

CROSS REFERENCE TO RELATED APPLICATION

This application is a divisional of U.S. patent application Ser. No. 15/185,573 filed Jun. 17, 2016, which claims priority to U.S. Provisional Application No. 62/180,855 filed Jun. 17, 2015.

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section.

The fan section includes a fan case that surrounds the rotating fan blades that contains high energy debris during a fan blade out event. The fan case is constructed with materials such as Kevlar and carbon composites to provide the required strength while also providing a reduction in weight. The Kevlar and carbon composite components are adequate for most engine configurations. However, in some engine configurations the composite materials are not adequate to meet desired containment capabilities.

Turbine engine manufacturers continue to seek further improvements to engine performance including improvements to thermal, transfer and propulsive efficiencies.

SUMMARY

In a featured embodiment, a method of fabricating a fan case for a gas turbine engine defines a metallic ring including an outer surface and an inner surface. A first composite material is assembled about the outer surface of the metallic ring. A second composite material is assembled about the first composite material. The first composite material and the second material are cured about the metallic ring within a tool to form a first subassembly. The first subassembly is removed from the tool.

In another embodiment according to the previous embodiment, includes assembling at least one of a rub strip and noise attenuation layer to the inner surface of the metallic ring.

In another embodiment according to any of the previous embodiments, assembling the first composite material to the metallic ring includes wrapping a third material about the outer surface.

In another embodiment according to any of the previous embodiments, assembly of the second composite material about the first composite material includes forming a carbon composite around an outer surface of the first composite material.

In another embodiment according to any of the previous embodiments, forming the first subassembly includes heating the first composite material and the second composite material about the metallic ring within the tool such that thermal expansion of the metallic ring forces the first composite material and the second composite material radially outward against an inner surface of the tool.

In another embodiment according to any of the previous embodiments, forming the first subassembly includes adhering the first composite material to the metallic ring and adhering the second composite material to the first composite material.

In another embodiment according to any of the previous embodiments, includes cooling the first subassembly within the tool such that the contraction of the thermal ring is constrained by the first composite material and the second composite material.

In another embodiment according to any of the previous embodiments, the metallic ring includes a thermal coefficient of expansion greater than both the first composite material and the second composite material.

In another embodiment according to any of the previous embodiments, includes attaching a rub strip to the within the first subassembly to define an inner-most radial surface.

In another embodiment according to any of the previous embodiments, includes forming the second composite material to include at least one attachment flange for securing the fan case to a static structure.

In another embodiment according to any of the previous embodiments, the metallic ring circumscribes the axial length radially outside fan blades.

In another featured embodiment, a fan case assembly for a gas turbine engine includes a metallic ring including an axial length corresponding to an axial width of fan blades within a fan section of the gas turbine engine. A first composite material is attached to a radially outer surface of the metallic ring. A second composite material is attached to a radially outer surface of the first composite material. The second composite material defines attachment features for securing the fan case assembly.

In another embodiment according to the previous embodiment, the first composite material includes Kevlar attached to the metallic ring.

In another embodiment according to any of the previous embodiments, the second composite material includes a carbon composite material. The second composite material defines an axial length of the fan case assembly.

In another embodiment according to any of the previous embodiments, includes a first noise attenuation layer attached to an inner surface of the metallic ring.

In another embodiment according to any of the previous embodiments, includes an abradable rub material attached on a radially inner side of the first noise attenuation layer.

In another embodiment according to any of the previous embodiments, includes a second noise attenuation layer attached to an inner surface of the second composite material aft of the metallic ring.

In another featured embodiment, a gas turbine engine includes a fan section including a plurality of fan blades rotatable about an engine axis. A fan case assembly circumscribes the fan blades. The fan case includes a metallic ring including an axial length corresponding to an axial width of fan blades within a fan section of the gas turbine engine. A Kevlar layer is attached to a radially outer surface of the metallic ring. A carbon composite layer is attached to a radially outer surface of the first Kevlar layer. The carbon composite layer defines attachment features for securing the fan case assembly.

In another embodiment according to the previous embodiment, includes a first noise attenuation layer attached to an inner surface of the metallic ring.

In another embodiment according to the previous embodiment, includes an abradable rub material attached on a radially inner side of the first noise attenuation layer.

In another embodiment according to the previous embodiment, includes a second noise attenuation layer attached to an inner surface of the carbon composite material aft of the metallic ring.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

BRIEF DESCRIPTION OF THE DRAWINGS

FIG. 5 is a schematic representation of an example step for fabrication of the example fan case.

FIG. 6 is a schematic view of another step for fabrication of the example fan case.

FIG. 7 is a schematic view of a curing step during fabrication of the example fan case.

FIG. 8 is a schematic view of a cooling step the example fan case.

DETAILED DESCRIPTION

Figures 1, 2:
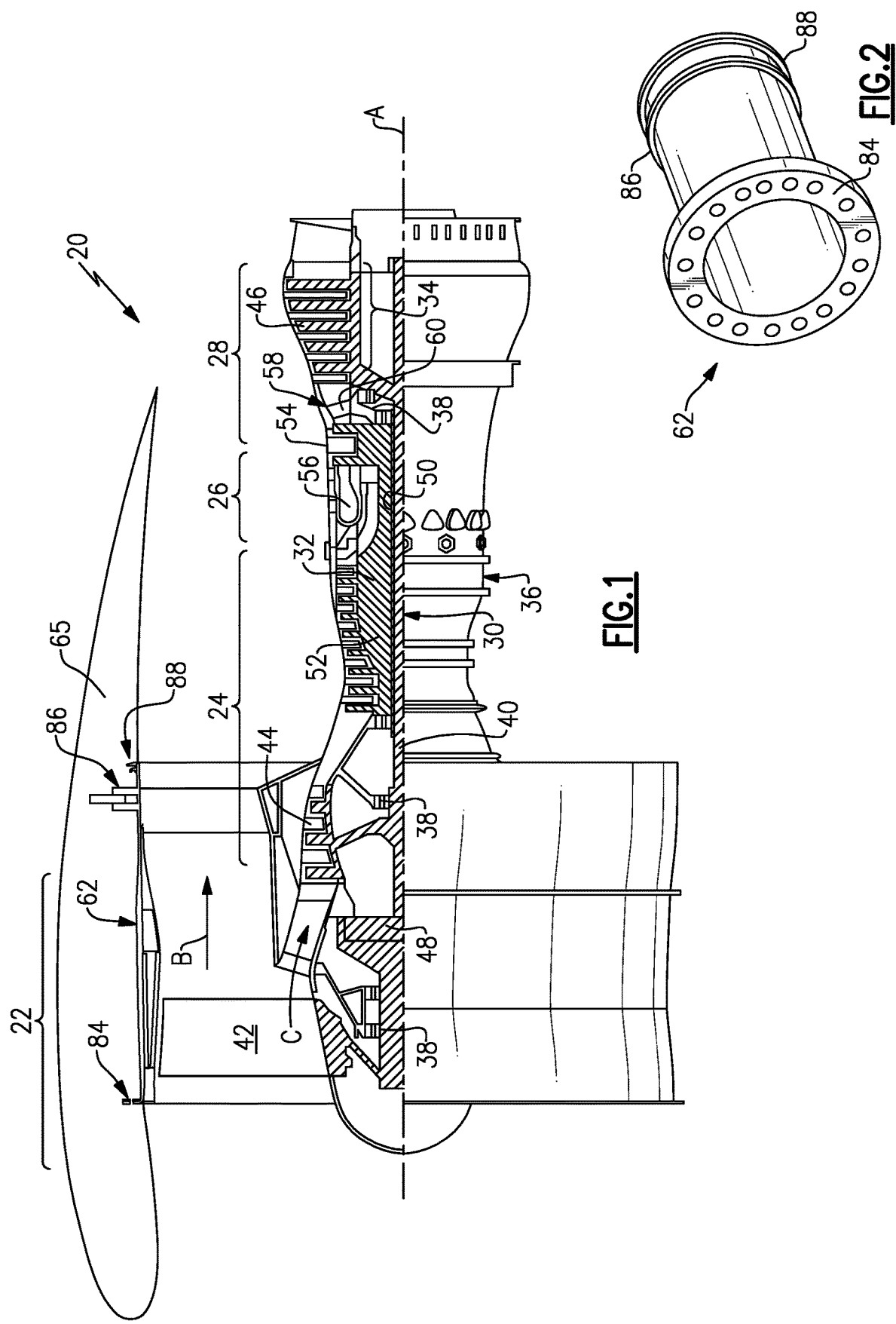
FIG. 1 schematically shows an example gas turbine engine embodiment.
FIG. 2 is a perspective view of an example fan case embodiment.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high-energy exhaust gas stream that expands through the turbine section 28 where energy is extracted and utilized to drive the fan section 22 and the compressor section 24.

Although the disclosed non-limiting embodiment depicts a two-spool turbofan gas turbine engine, it should be understood that the concepts described herein are not limited to use with two-spool turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 58 of the engine static structure 36 is arranged generally between the high pressure turbine 54 and the low pressure turbine 46. The mid-turbine frame 58 further supports bearing systems 38 in the turbine section 28 as well as setting airflow entering the low pressure turbine 46.

Airflow through the core airflow path C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 58 includes vanes 60, which are in the core airflow path and function as an inlet guide vane for the low pressure turbine 46. Utilizing the vane 60 of the mid-turbine frame 58 as the inlet guide vane for low pressure turbine 46 decreases the length of the low pressure turbine 46 without increasing the axial length of the mid-turbine frame 58. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment, the low fan pressure ratio is less than about 1.45.

"Low corrected fan tip speed" is the actual fan tip speed in ft/sec divided by an industry standard temperature correction of $[(\text{Tram } ° R)/(518.7° R)]^{0.5}$. The "Low corrected fan tip speed", as disclosed herein according to one non-limiting embodiment, is less than about 1150 ft/second.

The example gas turbine engine includes the fan 42 that comprises in one non-limiting embodiment less than about twenty-six (26) fan blades. In another non-limiting embodiment, the fan section 22 includes less than about twenty (20) fan blades. Moreover, in one disclosed embodiment the low pressure turbine 46 includes no more than about six (6) turbine rotors schematically indicated at 34. In another non-limiting example embodiment, the low pressure turbine 46 includes about three (3) turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

Gas turbine engines designs are seeking to increase overall efficiency by generating higher overall pressure ratios. By achieving higher overall pressure ratios, increased levels of performance and efficiency may be achieved. However, challenges are raised in that the parts and components associated with a high pressure turbine require additional cooling air as the overall pressure ratio increases.

Referring to FIG. 2 with continued reference to FIG. 1, the example gas turbine engine 20 includes a fan case 62. The fan case 62 is disposed proximate the fan section 22 and the fan blades 42. The fan case 62 functions to contain fan blades and other debris in the unlikely event of a fan blade out event. The example fan case 62 is disposed within the nacelle 65. The fan case 62 includes a forward flange 84, an aft flange 86 and an aft seal 88. The forward flange 84 and the aft flange 86 provide and include the features for securing portions of the engine to an aircraft. The aft flange 86 is disposed proximate to a plurality of fan exit guide vanes that provide a support function for the gas turbine engine.

Figure 3:
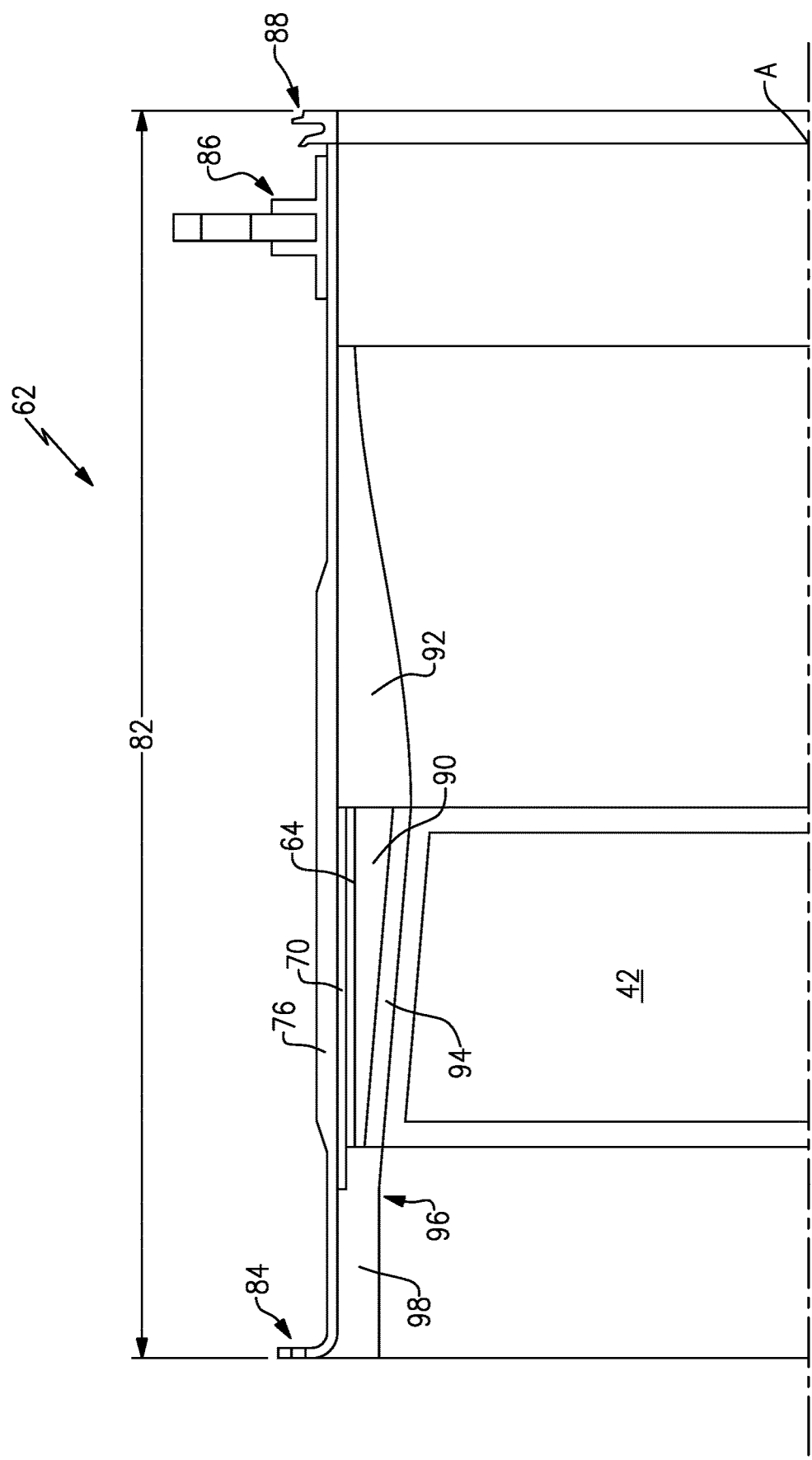
FIG. 3 is a sectional view of an example fan case embodiment.

Referring to FIG. 3 with continued reference to FIG. 1, the example fan case 62 includes composite structures for forming a lightweight component with the fan blade out containment capability. The example fan case assembly 62 includes a metallic ring 64 wrapped by a Kevlar layer 70. The Kevlar layer 70 is disposed within a carbon composite layer 76. Radially inside the metallic ring 64 is a first noise attenuation layer 90 and an abradable layer 94. The Kevlar layer 70, metallic ring 64, first noise attenuation structure 90 and the abradable layer are disposed axially within a length corresponding to the location of fan blades 42. A second noise attenuation structure 92 is supported within the carbon composite layer 76 aft of the fan blade 42. A third noise attenuation structure 98 is supported within the carbon composite layer 76 forward of the fan blade 42 and the metallic ring 64.

Figure 4:
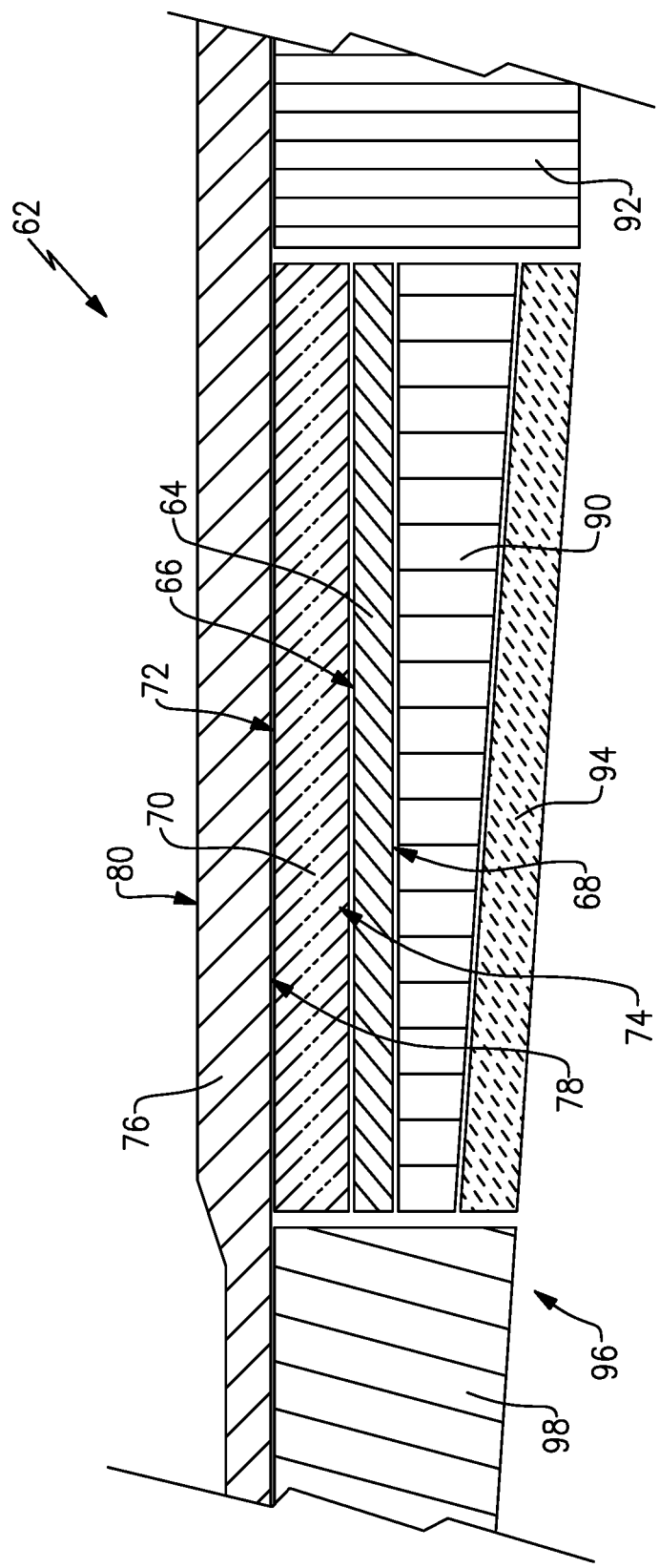
FIG. 4 is an enlarged sectional view of a portion of the example fan case.

Referring to FIG. 4, with continued reference to FIG. 3, the metallic ring 64 defines an outer surface 66 and an inner surface 68. The Kevlar layer 70 is adhered to the outer surface 66 of the metallic ring 64. Inner surface 78 of the composite layer 76 is further adhered to the outer surface 74 of the Kevlar layer 70.

The carbon composite layer 76 includes an outer surface 80 and defines an axial length 82. The axial length 82 extends from the forward flange 84 to the aft seal 88. The aft flange 86 is disposed proximate to the aft end and spaced inwardly from the aft seal 88. The aft flange 86 is not fabricated from a composite material but is a separate material that is slid over the outer surface 80 of the composite layer 76 to strengthen the fan case 62 and provide an attachment point for the engine 20.

The fan case 62 is disposed proximate to the rotating blades 42 of the fan section 22. The fan case 62 thereby includes an abradable portion 94 that is disposed radially outward of the tips of the fan blades 42. The abradable materials 94 is capable of contacting the fan blades 94 and reducing damage and other impact related stresses on the fan blades 42.

The fan case 62 includes noise attenuation layers 90, 92 and 98 to reduce the amount of noise emitted from the engine 20. Each of the noise attenuation structures 90, 92 and 98 include a honeycomb structure that are open to the interior surface 96 of the bypass flow passage B. The noise attenuation structures operate to absorb acoustic energy at specific frequencies to reduce noise emanating from the fan case and thereby the gas turbine engine 20.

The example fan case 62 includes the metallic layer 64 to add additional strength and containment capability to the fan case 62. In this example, the Kevlar layer 70 is wrapped around the outer radial surface 66 of the metallic ring 64. The Kevlar layer 70 in turn includes an outer radial surface 72 about which is disposed the carbon composite 76. The carbon composite 76 and the Kevlar layer 70 are matrix composites and are formed in partial part by fibers intermixed with a curable resin or other mixtures. The curable nature of the Kevlar layer 70 and the carbon composite layer 76 complicates assembly with a metallic ring 64. The complications arise due to the differences in thermal expansion between the metallic ring 64 and the composite structures 70 and 76. The metallic ring 64 has a much higher coefficient of thermal expansion and therefore expands and contracts a more than the Kevlar and carbon composite layers 70, 76.

Accordingly, the disclosed example fan case 62 is fabricated by curing or co-molding the metallic ring 64 with the Kevlar and carbon composite layers 76. Co-molding the metallic ring 64 with the Kevlar and the carbon composite layers 70 and 76 effectively bonds metallic ring 64 to the Kevlar and carbon composite layers 70 and 76. Bonding of the metallic ring 64 to the Kevlar and carbon composite layers 70, 76 form an overall stronger fan case structure with improved containment capabilities.

Referring to FIG. 5, the example fan case 62 is fabricate by defining the metallic ring structure 64 to include the inner surface 68 and outer surface 66. The diameter of the metallic ring 64 corresponds with a desired completed inner surface 96 (FIGS. 3 and 4). Furthermore, the axial length of the metallic ring 64 is defined to correspond with the axial length of the fan blades 42.

The fabrication process begins with applying the Kevlar layer 70 to the outer surface 66 of the metallic ring 64. In this example, the Kevlar layer 70 is wrapped about the outer structures of the metallic ring 64. The Kevlar layer 70 may also be a preformed cylinder that is slid over the metallic ring 64.

Referring to FIG. 6, once the Kevlar layer 70 is applied to the metallic ring 64, the Kevlar layer 70 and the metallic ring 64 is inserted at a specific axial location within the carbon composite layer 76. The carbon composite layer 76 is formed as a cylinder and is in a non-cured or partially cured form. The carbon composite layer 76 as well as the Kevlar layer 70 may be provided in non-cured or partially cured form during the assembly process. In either the partially cured or non-cured form, a curing step is required after the metallic ring 64 is fit into the Kevlar and carbon composite layers 70, 76.

Referring to FIG. 7, curing of the Kevlar layer 70 and the carbon composite layer 76 occurs within a tool that applies heat, indicated by arrows 104, and pressure to the parts for curing. In this example, an autoclave 100 is used that includes surfaces that define a cavity 105 into which the assembly created and shown in FIG. 6 is inserted. The cavity 105 defines an outer surface and an insert 102 is provided within the metallic ring 64. Accordingly, the metallic ring 64, Kevlar layer 70 and carbon composite layer 76 are inserted into the cavity 105 of the autoclave 100. The Kevlar and carbon composite layer 70, 76 and the metallic ring 64 are than brought to a condition including a temperature and pressure above those of ambient conditions to cure the Kevlar and carbon composite layers 70, 76.

Heating of the metallic ring 64, the Kevlar layer 70 and the carbon composite layer 76 is schematically indicated by arrows 104. During the heating process, pressure is also applied to cure the composite layers 70 and 76.

Because the metallic ring 64 includes a coefficient of thermal expansion that is greater than that of the composite layers 70, 76 it will expand faster and to at greater amount than the Kevlar and carbon composite layers 70, 76. The expansion is radially outward as well as axial. Thermal expansion of the metallic ring 64 is schematically indicated by arrow 106. Expansion of the Kevlar layer is schematically shown by arrows 108 and expansion of the carbon composite material is indicated by arrows 110. Each of these expansions 106, 108 and 110 is in the radial direction. As appreciated similar proportions of relative expansion between the components will also occur in an axial direction.

Expansion of the metallic ring 64 radially outward from the Kevlar layer 70 and the carbon composite layer 76 at the greater rates and amount as indicated by arrows 106 induces an increased pressure at the interface between the Kevlar layer 70 and the metallic ring 64. Moreover, the Kevlar layer 70 is further pressed against the carbon composite layer 76. Therefore, the outward radial expansion 106 of the metallic ring 64 add additional pressure against the Kevlar and carbon composite layers 70, 76 improves the bond between those layers and the metallic ring 64.

The pressures provided during the curing process generates a bond between the metallic ring 64 and the composite structure 70 and 76. The bond between the metallic ring 64 and composite structure 76 remains and forms a subassembly 75 that is removed from the heat and pressure within the autoclave 100. The bond thereby operates to reduce contraction of the metallic ring 64 as the sub-assembly cools.

In other words, because the composite structure 70 and 76 both expand and contract at a lesser rate than the metallic ring 64, during radial expansion the metallic ring 64 will induce increased pressures on the composite layer 70, 76 to provide an improved bond there between. Similarly, once the bond is formed, because the composite layers 70, 76 contract at a lesser rate, at least some portion of the thermal contraction caused by reduction or cooling of the metallic ring 64 is inhibited such the metallic ring 64 will contract at a lesser rate than if it were not bonded to the composite structure 70, 76. The lesser or smaller amount of contraction of a metallic ring 64 will aid in removal of the subassembly 75 from the autoclave 100 and the insert 102. The reduced contraction of the metallic ring 64 thereby eases removal from the autoclave 100.

Referring to FIG. 8, contraction of the metallic ring 64, the Kevlar layer and the carbon composite layer 76 curing cooling is schematically illustrated by arrows 112, 114 and 116, respectively. As appreciated, the contraction illustrated by arrows 112, 114 and 116 illustrates contraction of the metallic ring 112 is substantially the same as the contraction indicated by arrows 114 and 116 of the composite structures 70, 76. The substantially uniform contraction is due to the metallic ring 64 being adhered or bonded to the composite structures 70 and 76. This reduction in contractions eases removal from the autoclave 100. The remaining fan case components can then be installed to complete the fan case 62. In this example, the aft flange 86 and aft seal 88 are inserted over the composite structure 76. The forward flange 84 in this example is an integrally formed part of the carbon composite layer 76. It within the contemplation of this disclosure that additional structures may be installed and that those structures may be separately or integrally formed as part of the composite layers 70, 76.

Moreover, referring to FIG. 3 with continued reference to FIG. 8, additional components that are assembled to the fan case 62 include the attenuation layers 90, 92 and 98 and the abradable layer 94. Each of these structures are assembled into the composite structure 76 that supports the entire fan case 62 according to known methods and techniques.

Accordingly, including the metallic ring with the composite structures during the co-molding and/or curing process provides an improved bond to form a laminated structure including a combination of the composite materials with the metallic ring. The disclosed fan case including the metallic ring provides increased containment capability and ease of assembly and fabrication.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A fan case assembly for a gas turbine engine, the fan case assembly comprising:

a metallic ring including an axial length corresponding to an axial width of fan blades within a fan section of the gas turbine engine;

a first composite material attached to a radially outer surface of the metallic ring; and a second composite material attached to a radially outer surface of the first composite material, wherein the second composite material defines attachment features for securing the fan case assembly, wherein the first composite material and the second composite material form a composite structure with the metallic ring having a greater coefficient of thermal expansion than the composite structure and the composite structure is bonded to the metallic ring such that the metallic ring and composite structure contract at a lesser rate than the metallic ring alone.

2. The fan case assembly as recited in claim 1, wherein the first composite material comprises aramid fibers attached to the metallic ring.

3. The fan case assembly as recited in claim 2, wherein the second composite material comprises a carbon composite material, wherein the second composite material defines an axial length of the fan case assembly.

4. The fan case assembly as recited in claim 1, including a first noise attenuation layer attached to an inner surface of the metallic ring.

5. The fan case assembly as recited in claim 4, including an abradable rub material attached on a radially inner side of the first noise attenuation layer.

6. The fan case assembly as recited in claim 5, including a second noise attenuation layer attached to an inner surface of the second composite material aft of the metallic ring.

7. A gas turbine engine comprising;
a fan section including a plurality of fan blades rotatable about an engine axis; and
a fan case assembly circumscribing the fan blades, the fan case including:
a metallic ring including an axial length corresponding to an axial width of fan blades within a fan section of the gas turbine engine;
an aramid fiber layer attached to a radially outer surface of the metallic ring; and
a carbon composite layer attached to a radially outer surface of the aramid fiber layer, wherein the carbon composite layer defines attachment features for securing the fan case assembly, wherein the aramid fiber layer and the carbon composite layer form a composite structure bonded to the metallic ring with the metallic ring has a greater coefficient of thermal expansion than the composite structure and the metallic ring and composite structure contract at a lesser rate than the metallic ring alone.

8. The gas turbine engine as recited in claim 7, including a first noise attenuation layer attached to an inner surface of the metallic ring.

9. The gas turbine engine as recited in claim 8, including an abradable rub material attached on a radially inner side of the first noise attenuation layer.

10. The gas turbine engine as recited in claim 9, including a second noise attenuation layer attached to an inner surface of the carbon composite material aft of the metallic ring.

* * * * *